United States Patent
Leal

(12) 
(10) Patent No.: US 6,189,003 B1
(45) Date of Patent: Feb. 13, 2001

(54) ONLINE BUSINESS DIRECTORY WITH PREDEFINED SEARCH TEMPLATE FOR FACILITATING THE MATCHING OF BUYERS TO QUALIFIED SELLERS

(75) Inventor: Fernando Leal, Chicago, IL (US)

(73) Assignee: WynWyn.com Inc., Chicago, IL (US)

(*) Notice: Under 35 U.S.C. 154(b), the term of this patent shall be extended for 0 days.

(21) Appl. No.: 09/178,097

(22) Filed: Oct. 23, 1998

(51) Int. Cl.$^7$ ..................................................... G06F 17/30
(52) U.S. Cl. .................. 707/2; 707/10; 707/104
(58) Field of Search ........................... 707/1, 4, 10, 104, 707/2

(56) References Cited

U.S. PATENT DOCUMENTS

| | | | |
|---|---|---|---|
| 5,715,444 | * | 2/1998 | Danish et al. ............................ 707/4 |
| 5,930,474 | * | 7/1999 | Dunworth et al. ...................... 707/10 |

OTHER PUBLICATIONS

At Hand Network(sm) Expands Reach; New Partnership Pacts With HotBot, GeoCities, LookSmart Give At Hand Network Exclusive Yellow Page Distribution. PR Newswire, Oct. 19, 1998, p. p3849.*

Vicinity Delivers YourTown GeoEnabled Business Directory to Yahoo!, Lycos, Geocities, Travelocity and Planet Direct, Business Wire, Jul. 15, 1996, p. 07157087.*

Excite & GTE Directories Offer SurperPages, Newsbytes, Nov. 24, 1997, p. NEW11240038.*

Ashany, R. Application of Sparse Matrix techniques to Search Retrieval, Classification, and Relationship Analysis in Large Data Base Systems—SPARCOM, Fourth International Conference on Very Large Data Bases, Sep. 1978, pp. 499–516.*

Article form the Internet entitled, "Yellow Page Alliance Called Unfair", by Jeff Pelline dated Aug. 12, 1997.

* cited by examiner

Primary Examiner—Jack Choules
(74) Attorney, Agent, or Firm—Brinks Hofer Gilson & Lione

(57) ABSTRACT

A system and method to provide buyers with information that supports the selection of qualified vendors and service providers at the precise time they are prepared to make a purchase. To accomplish its function, the system includes three core elements: (1) a data retrieval system that makes it easy for ready and willing buyers to find and contact qualified businesses; (2) a proprietary electronic database with enhanced information regarding local businesses; (3) an electronic distribution network that employs live, enhanced directory assistance (EDA) operators via telephone as well as the World Wide Web, and simplifies the connections between motivated buyers and qualified sellers. Buyers are able to search the database of businesses to find the most qualified providers of goods/service that match their unique criteria. Sellers can use the service to better promote their offerings to a market that has moved beyond window shopping and that is ready to buy.

22 Claims, 5 Drawing Sheets

Microfiche Appendix Included
(8 Microfiche, 734 Pages)

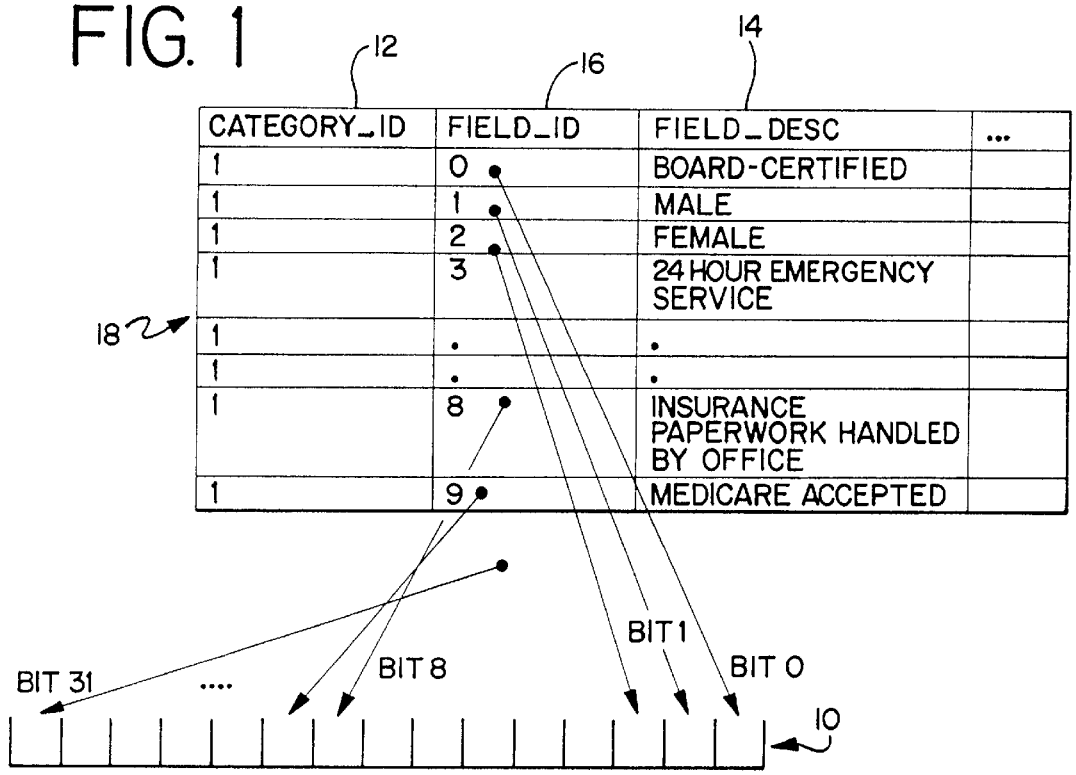
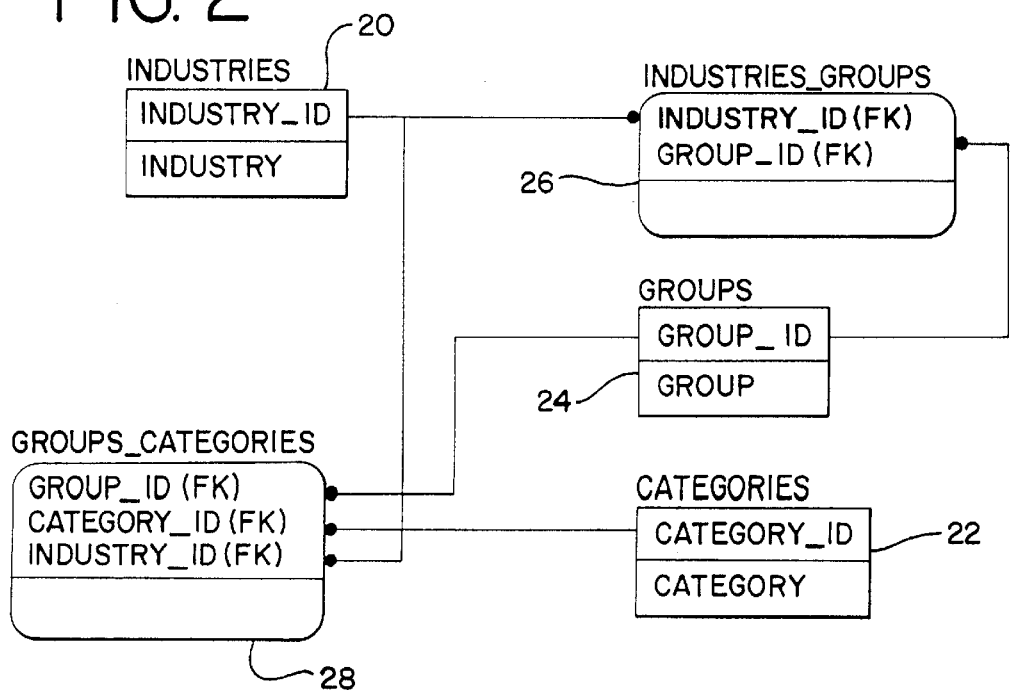

ONLINE BUSINESS DIRECTORY WITH PREDEFINED SEARCH TEMPLATE FOR FACILITATING THE MATCHING OF BUYERS TO QUALIFIED SELLERS

MICROFICHE/COPYRIGHT REFERENCE

A Microfiche Appendix having a total of 734 frames (8 sheets) is included in this application that contains material which is subject to copyright protection. The copyright owner has no objection to the facsimile reproduction by anyone of the Microfiche Appendix, as it appears in the Patent and Trademark Office patent files or records, but otherwise reserves all copyright rights whatsoever.

FIELD OF THE INVENTION

This invention relates to online search engines, and more particularly to Electronic Yellow Pages, Internet Yellow Pages and Operator Assisted Yellow Pages services that enable a user to find relevant listings of businesses needed to fulfill their product/service needs.

BACKGROUND OF THE INVENTION

Many times when using existing search engines and Electronic Yellow Pages ("EYP") a user cannot target a search among the thousands of potential listings, leaving the user with too many choices to make or too many results in response to a search request. The traditional directories offer too broad of a selection since they are limited to searches by business category or address. These directories do not facilitate searching by specific attributes such as hours of operations, special services, detailed product lines, etc.

Also, once the user finds the listings from a search, the user typically cannot use the online medium to contact potential vendors directly over the Internet, through e-mail or via other electronic communication mediums. This leaves the user with the cumbersome task of following up by telephone in order to contact each listing separately and individually, which is inherently limited to following up during normal business hours. In many cases, users desire to follow up with more than one of the businesses identified by the search. Currently, the user must contact each business sequentially and during business hours.

Alternatively, businesses that are interested in leveraging the communications and marketing power of the Internet can either build their own Web site or purchase an enhanced online listing within an EYP. However, there is currently no platform that enables an advertiser to start with a simple listing (name, address, phone number), enhance it with detailed business information, and leverage a communications application under one program. What is lacking is a simple, convenient and inexpensive method and system for businesses to receive personalized inquiries, and solicit orders electronically from consumers specifically seeking that business's products or services.

As a result, the overall market lacks a convenient and easy to use methodology to bridge the gap between motivated buyer and qualified seller. Motivated buyers need a better search process, involving the use of tools that personalize their search criteria. Qualified sellers require an enhanced way for buyers to find and select sellers via tools that enable sellers to feature/promote the attributes that best define their market offerings. Both parties also require a convenient way for each party to communicate with each other, accelerating the buying and selling processes.

SUMMARY OF THE INVENTION

In view of the above, the invention provides a system and method for deriving search templates for searching of business directory data. According to the method, at least one search criteria is identified that is defined through research about companies in at least one category of business. Business directory data is then obtained for at least one business listing, where the business directory data comprises at least a business name, address and telephone number. At least one category attribute representative of the at least one business listing is developed to facilitate categorical classification of the at least one business listing. At least one search template is then dynamically derived in response to a search request received from a user. The at least one search template is used to electronically search a directory database to identify at least one business in response to the search request.

According to the system of the invention, a data retrieval system is provided that is operative to allow ready and willing buyers to find and contact qualified businesses. A database coupled to the data retrieval system stores business directory data including enhanced information regarding local businesses. An electronic distribution network is coupled to the database for facilitating connections between motivated buyers and qualified sellers.

The invention thus provides the end user with a more detailed search tool that can refine and target their search process to find a qualified vendor of products/services in an electronic directory, narrowing down a list of potential candidates to those that have the highest relevancy matching the user's specific search criteria, and enables the user to broadcast a specific, unique purchase related request to these targeted candidates via an electronic platform.

These and other features and advantages of the invention will become apparent upon review of the following detailed description of the presently preferred embodiments of the invention, taken in conjunction with the appended drawings.

BRIEF DESCRIPTION OF SEVERAL VIEWS OF THE DRAWINGS

FIG. 1 shows the 32-bit word scheme used in the preferred embodiment, along with corresponding bit fields;

FIG. 2 illustrates the relationship between Industries and Categories;

DETAILED DESCRIPTION OF THE PRESENTLY PREFERRED EMBODIMENTS OF THE INVENTION

Figure 3:
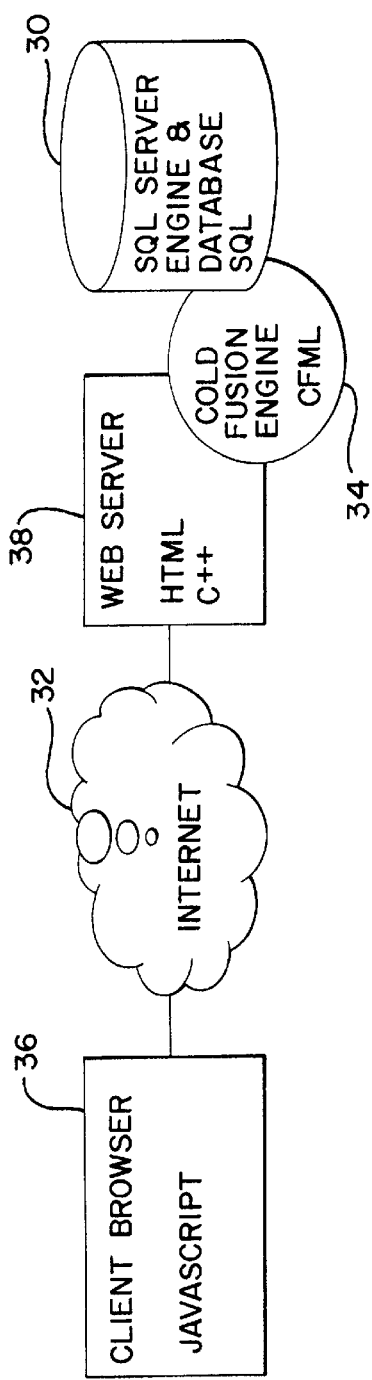
FIG. 3 illustrates the client/server environment.

Reference is now made to the drawings, where like reference numerals refer to like elements throughout. In the presently preferred embodiment, the invention provides an enhanced search engine/directory made up of listings of businesses and their featured products and services. Each individual business can promote itself via an electronic template that displays a uniform set of criteria for each business category. The templates also allow users to select from a list of category specific fields to refine their search criteria (e.g. specialty services, hours of operation, special promotions, etc.). Once the above options have been selected, the search engine generates a complete list of potential providers with the candidates that have the most relevancy/matches coming up first. After this focused list of providers has been generated, the user can then contact those identified in the targeted search on his own, or the user can continue the process by using a "Request Express" communication platform, which directly connects the user to an electronics communication medium used by the business to solicit and receive purchase related inquiries.

The Request Express feature is an "intelligent agent" style communications program that allows the end user to further define their needs beyond the initial search criteria and to broadcast their focused and complete purchase-related inquiry to the most qualified vendors. The user's requests are further defined by use of multiple levels of additional attributes the user can select from. These attributes are preferably presented and displayed to the user through a graphic user interference ("GUI"). The user can also generate specific personalized requests via an e-mail script box inside the Request Express program. These requests are then sent to the system provider's server to be immediately broadcast (via e-mail or fax) to selected businesses fitting those exact criteria. Businesses capable of receiving the broadcast and satisfying the user's search request are identified at the time the results are presented to the end user. The end user can select one or more businesses to receive the broadcast message.

1. How the Database is Built

The main purpose of the database is to provide for the searching of hundreds of thousands of records. A preliminary requirement of the database therefore is to handle a great amount of record searching in the least possible time while minimizing the server's activity and maximizing performance. The presently preferred embodiment of the database represents each attribute as a single record in an associative table between the company and a list of category fields relative to that company's products and/or services. (This relationship is described in greater detail below in connection with FIG. 6). This would typically require the use of temporary tables, which would raise a disk drive's activity and slow the server down.

In the preferred embodiment all of the company's attributes are codified into one unique binary number 10 for each category 12 that the company falls in, as shown in FIG. 1. This approach only requires one record to represent all of the company's attributes 14 for every category 12 the company is included in. A hashing technique variation is used within the Field_ID 16 because an assembly of attributes is converted into one single value. For optimization reasons, a 32-bit word scheme is presently preferred. The codification method is used with the Specific_Fields and binSpecialFields variables (decimal and binary representations) with 32-bit words, and a similar codification is used for Standard_Fields and binStandardFields with 16-bit words.

Tables are then developed in the database reflective of the types of businesses stored. The highest level of the table organization is the Industries table 20—such as physicians, contractors, etc.—as shown in FIG. 2. There usually is at least a dozen industries that can render services in one or more supercategories or groups. At the same time, categories 22 can be included in more than one industry. FIG. 2 illustrates the relationship between the tables Industries 20 and Categories 22. Groups 24 can also be formed, such as Industries_Groups 26 and Groups_Categories 28.

In the preferred classification scheme, as mentioned above, a category 22 can be included in more than one industry 20. At the same time, a category 22 can also be included in a different group 24. Each industry 20 falls in different groups 24, and the relationship between each industry 20 is found in the Industries_Groups 26 association. Each group 24 in each industry 20 contains certain categories 22, which can be repeated in Industries 20 and therefore in the group 24. The table storing these relationships is preferably defined as Groups Categories 28.

Each category 22 can be found based upon its Category_Fields 14 (see FIG. 1), which are associated directly with each category 22. The relationship determined is a "1 to n" relationship. Since each company can typically provide services in a few aspects of each category 22, the determining values of its presence are binary codified numbers 10 contained in the Company_Information table 18. The binary codified numbers 10 are described in greater detail below.

The presently preferred embodiment of the database was developed with Microsoft SQL Server version 6.5 under a Microsoft Windows NT platform. This server is preferred due to its velocity, the platform it runs in, and its capacity for handling large amounts of records, which features are important to the database decision.

The presently preferred process language of the software program provided in the Microfiche Appendix and used with the SQL Server is an extended dialectic of the ANSI SQL 92 language. The presently preferred way to access the database 30 through the Internet 32 is with the use of scripts of a language called Cold Fusion Markup Language ("CFML") 34, shown in FIG. 3. As those skilled in the art will appreciate, these scripts are written partly in the Hyper Text Markup Language ("HTML"), and partly in CFML. In the preferred embodiment, Java Script is also used, but mainly for validation purposes. These scripts validate the client's information while executing on the browser side 36 to maximize performance. Software written in the C/C++ language is also used on the server side 38 implemented in a CGI which computes and displays coupons as shown in FIG. 3.

2. Database Population

Figure 8:
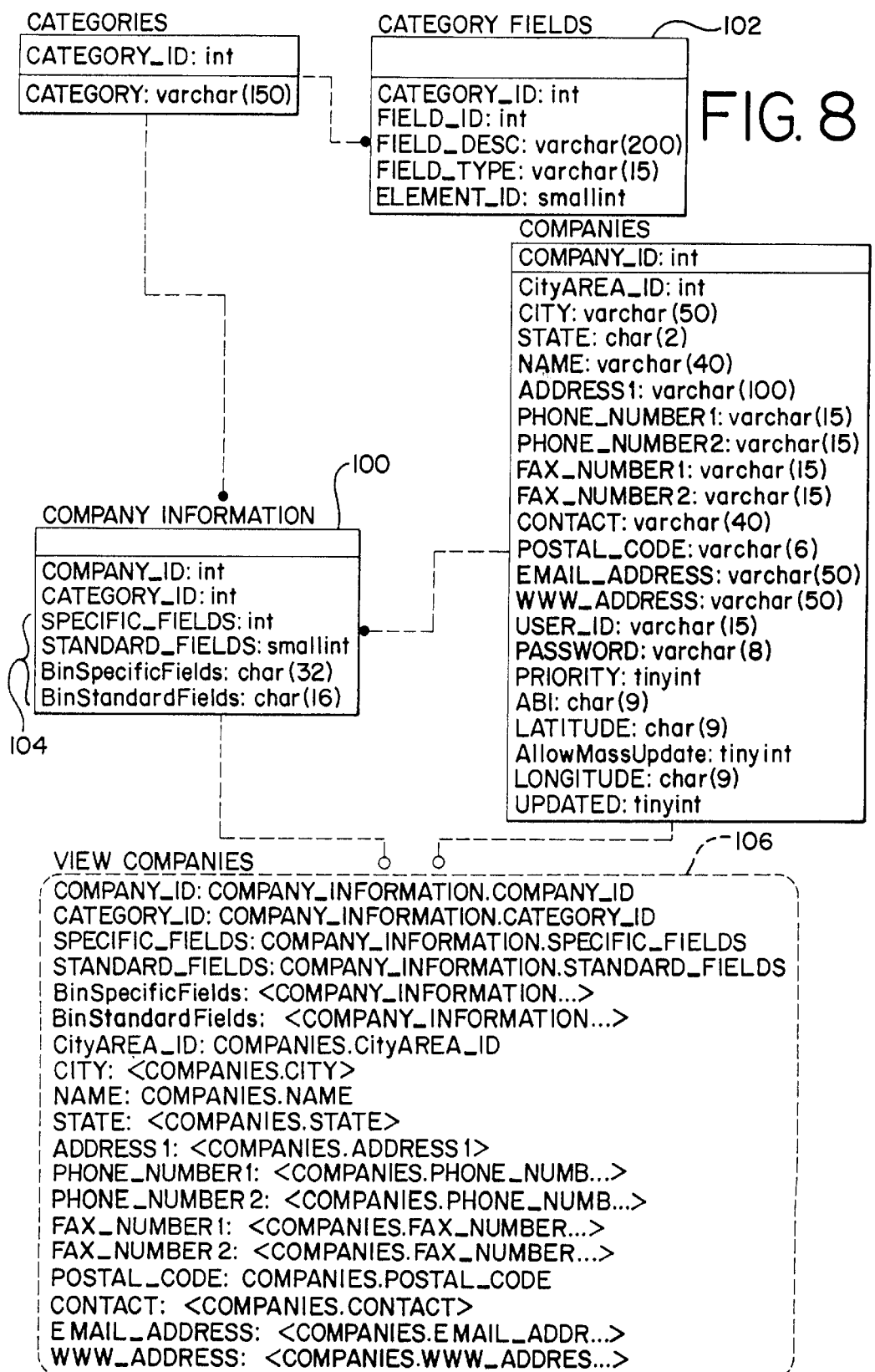
FIG. 8 illustrates the template development process.

As mentioned in the previous section, the relating information about the participating members' businesses is saved in a table called Company_Information 100 (FIG. 8). The associated information to the Category_Fields 102 is kept in the Standard_Fields, BinSpecificFields, Specific_Fields and binStandardFields records 104. This information is repeated in some cases because some processes require bit-to-bit operation searches. Because of the database engine features, as those skilled in the art will appreciate, there are times when a simple decimal operation can be used to obtain results depending on the binary representation of the number.

There are two presently preferred options for extracting information. The first and the simplest one consists of the name like coincidences. An SQL statement SELECT-LIKE inserted into the CFML script is enough to perform this task. This operation is done in the View_Companies table 106. The second option is performed when a pattern coincidence search is required. This option is used when a query is executed and certain category fields are specified. If only coincidences were needed, a bit-to-bit operation would be enough for the query to return the matching results based simply upon the decimal representation. Because the number of coincidences is also needed, decimal operations of the number are also required. The following example provides an illustration of a typical search string comparison.

EXAMPLE:

If the user wants to consult all the members/companies that are included in category 37, and the Category Fields selected are 0,2,4,6, the following binary representations and fields are established:

```
SpecificFields      = 85
ArraySpecific[32]   = 00000000000000000000000001010101
StandardFields      = 1
ArrayStandard[16]   = 0000000000000001
```

The following code is an example of what the source code for the above example would look like:

<CFQUERY DATASOURCE="WYNWYN" NAME="QCompanies">select distinct Company_ID, Name, Address1, City, State, Postal_Code, Phone_Number1, Fax_Number1,
/* We call the substring method to get the value of bits 1 and 2 to determine if the business is a Fast Lane program Member or has coupons.
substring(binStandardFields, 16,1) as Request Express
substring(binStandardFields, 15,1) as Coupon
<cfif (#UserFields# is not "0")>
'(
/* First, we summarize specific fields section.
To process a request for Odor Removal, Repair and Furniture Upholstery—

```
(Convert(int,(substring(binSpecificFields,1,1))) & #arraySpecific[1]# )+
(Convert(int,(substring(binspecificFields,2,1))) & #arraySpecific[2]# )+
(Convert(int,(substring(binspecificFields,3,1))) & #arraySpecific[3]# )+
(Convert(int,(substring(binSpecificFields,4,1))) & #arraySpecific[4]# )+
   . . .
   . . .
   . . .
(Convert(int,(substring(binspecificFields,30,1))) & #arraySpecific[30]# )+
(Convert(int,(substring(binspecificFields,31,1))) & #arraySpecific[31]# )+
(Convert(int,(substring(binspecificFields,32,1))) & #arraySpecific[32]# )+
```

/*Second, we do the same for the standard fields.

To process selection of the Internet Coupons option—

```
(Convert(int,(substring(binStandardFields,1,1))) & #arrayStandard[1]# )+
(Convert(int,(substring(binStandardFields,2,1))) & #arrayStandard[2]# )+
(Convert(int,(substring(binstandardFields,3,1))) & #arrayStandard[3]# )+
   . . .
   . . .
   . . .
(Convert(int,(substring(binStandardFields,14,1))) & #arrayStandard[14]# )+
(Convert(int,(substring(binstandardFields,15,1))) & #arrayStandard[15]# )+
(Convert(int,(substring(binStandardFields,16,1))) & #arrayStandard[16]# )
```

) as NumBits
</cfif>
from view_Companies
where
 (Category_ID=#cboCategory#)
 <cfif #SpecificFields# is not "0">
  and ((Specific_Fields & #SpecificFields#)<>0)
 </cfif>
 <cfif #StandarFields# is not "0">
  and ((Standard_Fields & #StandarFields#)<>0)
 </cfif>
 <cfif #cboState# is not "0">
  and State='#cboState#'
 </cfif>
 <cfif #cboCity# is not "0">
  and CityArea_id=#cboCity#
 </cfif>
 <cfif #fldBusiness# is not"">
  and Name like '%#fldBusiness#%'
 </cfif>
 <cfif#fldPostalCode# is not "">
  and Postal_Code='#fldPostalCode#'
 </cfif>
 <cfif (#UserFields# is not "0")>
  order by Numbits desc, Name
 <cfelse>
  order by Name
 </cfif>
</CFQUERY>

This query is done in the View_Companies table 106 since it contains all the records needed by the SQL statement.

Companies can then be searched based on the templates created for each company. Each company's template is created in a dynamic way using CFML scripts. As those skilled in the art will appreciate, CFML provides a way to embed HTML with CFML Tags, which provide flow sentences and control. The template designs are made dynamically. Each category is divided in groups of Category_Fields, which determine what will be displayed on each template. The process of forming the template and populating the data for each template is described in detail below.

Figure 4:
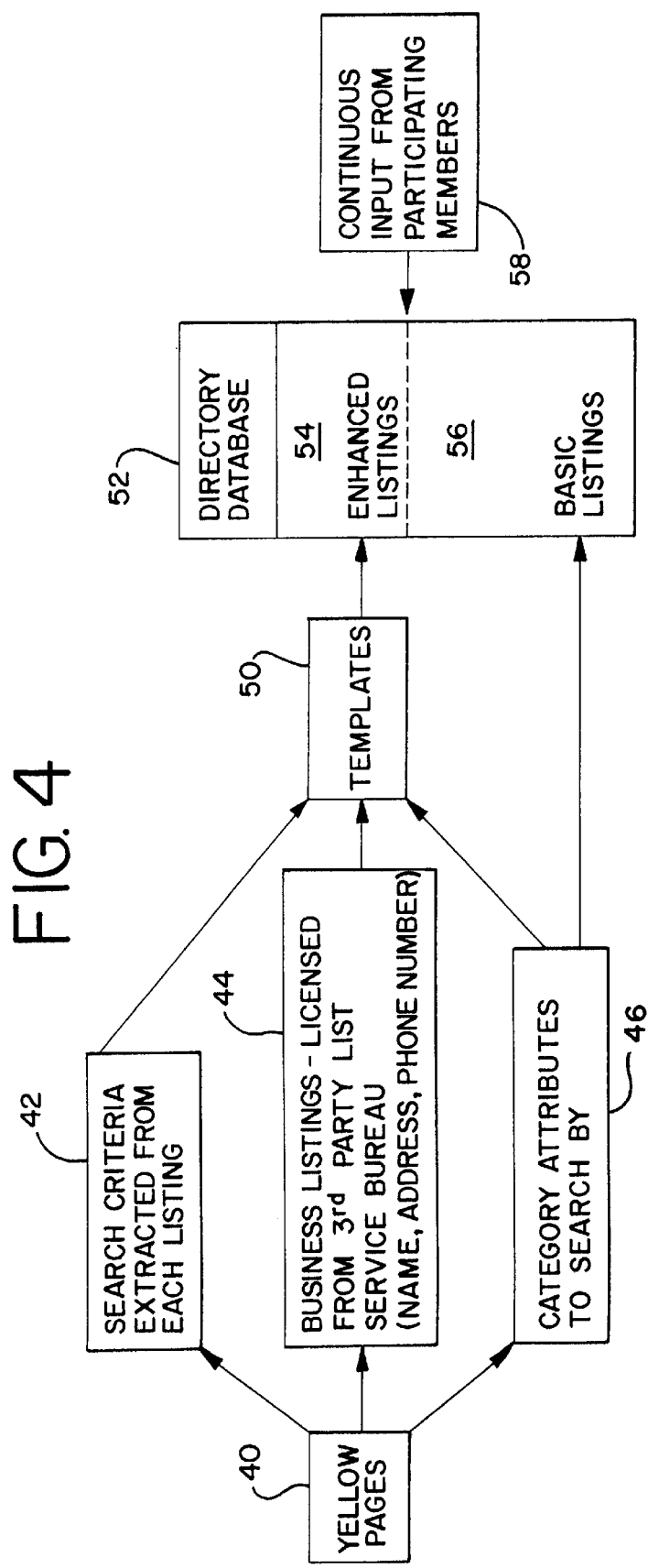
FIG. 4 illustrates a flow chart for template creation.

A flow chart of the template creation process is provided in FIG. 4. Basic business listings 44, which can be owned by the service provider or licensed from a third party list service bureau, typically provide at least a company's name, address and telephone number. Each listing 44 may be enhanced by incorporating the business' attributes they wish to promote. These attributes are gathered from one or more sources including personal interviews with the business, yellow page listings, advertising, collateral and other sources. Starting with the yellow pages 40, a plurality of search criteria 42 are extracted from each listing based on the advertising copy in the telephone book itself. Category attributes 46 are then identified for which the user can later search the database.

Using all of the above items, a search template 50 is dynamically developed each time a search is initiated that reflects the type of business/product/service the user is attempting to identify. The user's search can then be performed on the database 52 via the search template 50. Preferably, the database 52 includes both basic listings of business products and services 54 and enhanced listings 56 for businesses. These listings are also preferably continuously updated, modified, added to and deleted 58, as reflected in FIG. 4, by participating companies as their businesses change.

One excerpt of a presently preferred program for searching the database 52 is provided in the example below.

Example: This code will output the search options depending on the results from the SQL statement. How the search results are generated is based on the specific inputted criteria from the user--->

```
<cfquery name="QFields" datasource="WYNWYNN">
    SELECT DISTINCT * from Category_Fields
    WHERE Category_ID=#cboCategory#
    ORDER BY Element_ID,Field_ID
</cfquery>
. . .
<cfoutput query="QFields">
    <cfif #columna# is "1">
        <CFSET Contador=#contador#+1>
        <tr><td width=50%><input type="checkbox"
            name="chkCatFields"
    value="#Field_id#">
        <FONT size="-1" FACE="Arial">#Field_Desc#</
            FONT>
        </td>
        <cfset #columna#="2">
    <cfelse>
        <CFSET Contador=#contador# +1>
        <td width=50%><input type="checkbox" name=
            "chkCatFields"
    value="#Field_id#">
        <FONT size="-1" FACE="Arial">#Field_Desc#</
            FONT></td></tr>
        <cfset #columna#="1">
    </cfif>
</cfoutput>
```

Using the above methodology, a columned checkbox array is preferably created by the computer program provided in the Microfiche Appendix. Each checkbox is provided with its own ID, which is related to the category Field_ID 102 (see FIG. 8). Depending on the checks the user makes, a bit word will be generated in a binary notation containing 0's and 1's, as described above. The 1's thus represent the user's selected checkboxes. Likewise, the dynamically formed template 50 (FIG. 4) will be created upon each association with the participating business. In other words, the template 50 reflects the association between the company and the categories it falls in. At the same time, the program verifies if the criteria selected by the user specifically match the attributes listed by participating businesses.

As mentioned above, the values of the template 50 are preferably stored in both a decimal and in a binary representation. The result is a faster query and greater system efficiency. As also mentioned before, according to the user's selection, a key in a decimal value, as well as one in a binary representation, is created. When sorted and stored in the Company_Information table 100 (FIG. 8), subsequent queries can be made based on this model.

The products and services attributes of any template 50 are updated according to the needs of the businesses, as shown in FIG. 4. If the participating business needs to update its attributes, it can do so on its own or with the assistance of a service provider administrator by entering an administration module where the business will be able to select a category, delete a category, or change its attributes. If a business desires to delete a Category_Field 102 (FIG. 8), the only restriction is that no other businesses are using that category at that time.

3. Details of the Search Engine

Figure 5:
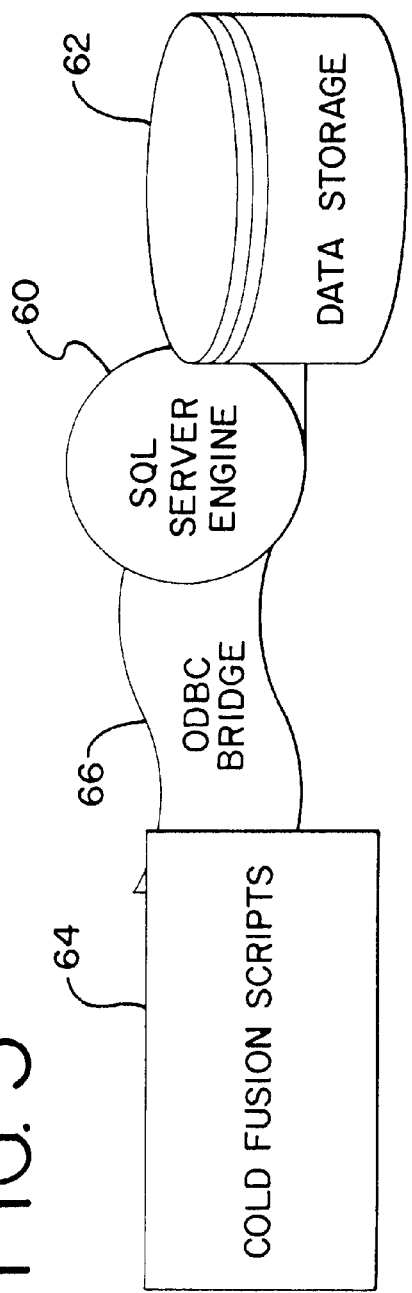
FIG. 5 shows the interaction between the data manager, the ODBC bridge and the database.

The system comprises a complex search engine made up of distinct functional parts. An Application Program Interface (API) is used to access the database 30 (FIG. 3) to address the requirements made by varieties of services and connections. The API is also preferably written in the CFML language 64 (see FIG. 5), which widens or broadens the HTML language as described above. As shown in FIG. 5, the selection of the search engine is closely associated with the chosen database engine, which is preferably the Microsoft SQL Server 60 described above.

A relational database 62 is preferably used and allows for complete functionality with desktop integration under the Microsoft Windows NT 4.0 or UNIX environment. The connection between the GUI and the database 62 is accomplished with the Open Database Connectivity (ODBC) bridge 66 generally known in the art.

4. Development of the Request Express

Figure 6:
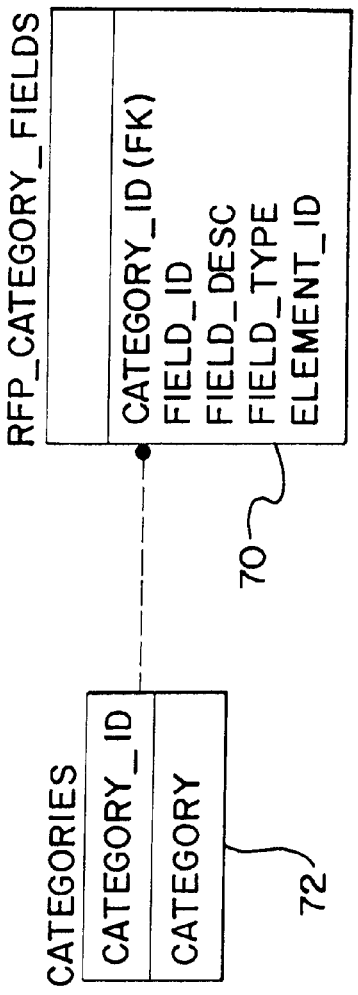
FIG. 6 illustrates the relationship between Categories and RFP_Category_Fields.

An enhanced database query is constructed in a dynamic manner, in the same way the category fields selections are created. Results of the enhanced search can be generated in the same manner that results can be responded to in a initial specific category search. Referring to FIG. 6, association is simply a query in RFP_Category_Fields 70 for a particular category in the Categories table 72. A relationship diagram between both tables 70, 72 is shown in FIG. 6.

Once the search process is complete and a personalized request has been developed, the user can issue faxes and e-mail depending on the response method selected by the business (the business needs to be enabled for fax and/or e-mail). If the e-mail option is selected for the response method, a CFML API is used in order to accomplish this task. If the fax option is selected, the task is preferably Symantec's WinFax program to convert an incoming request from the user to an outgoing fax sent to the participating business.

5. Process from the User Perspective

First, a user selects a category from a list of n categories to search. There are preferably two options for category selections. The first is selected from the Main_Category- Group_Category, and the second is selected from the Business type search. The first option leads the user to the category's selection. The user alternatively can select one of the categories using the Business groups as a guide (such as for example selecting the overall Main Category—Business Group "Home and Garden" to find the "Carpet Cleaner" industry category). In the second case, if the user has an idea of the type of business they are searching for, the user writes the describing text located in the Quick Search menu and clicks the submit button. The system preferably will deploy a "synonym" translator program generally known in the art to make the proper relational database search so that entering "Rug Cleaner" will connect to the "Carpet Cleaner" category.

Another way to search specific companies is by the business' name. If the user needs to identify certain businesses that provide a specified service, and the user already knows the company's name, the user can write it in a Quick Search menu provided by the program, which will display a results template if any records matching the name or partial name of the business are found. The user can also specify a zip code of the companies he/she is searching to limit the geographic range of the search.

After the user selects a category, he can then select the category fields or attributes of a template by merely clicking on them. Using JavaScript, a 16-bit word (or greater) is created, and another word with 32-bits (or greater) of length is also developed (described above). The first word represents the selection that was made within the standard fields, and the second word represents the selection that was made in the specific fields. In this way, the program only searches the preferences in the table which have such information, e.g., "Company Information". This results in higher performance of the search process.

For businesses within each category that the user desires information about, the program takes the two binary words that were formed, and through a database query extracts the companies which have coincidences with those words, preferably in order from greater to lesser. In this way, the program considers the word used to make the comparison having the following structure:

$$X = x_{n-1} x_{n-2} x_{n-3} \ldots x_3 x_2 x_1 x_0$$

Where:

X: word with length n bits $x_n$: bit at position n n: number of bits-per word(32 for Specific Fields and 16 for Standard Fields.

m: number of bits in Specific Fields+number of bits in Standard Fields (Bit positions are 0–31 for Specific Fields and 0–15 for Standard Fields.)

The operation used to determinate the number of coincidences is set forth as follows:

Let $U = u_{m-1} u_{m-2} u_{m-3} \ldots u_3 u_2 u_1 u_0$: where U represents the word used, which has the preferences of the user; and $B = b_{m-1} b_{m-2} b_{m-3} \ldots b_3 b_2 b_1 b_0$: where B represents the word to compare to in the database. The function used to search measure how many criteria were matched within a given business listing is thus expressed as:

$$\text{Number of coincidence Bits} = \sum_{i=0}^{m} u_i b_i$$

If there are positive results to the user's query, those results are preferably displayed in a table format. A ratio of the number of criteria matched to the number of criteria the user selected is also preferably displayed for each listing. The fields listed give the user an idea of the results of the query, and preferably include the Company name, address, city, zip code, phone number and the fax number, to allow the user to contact the business directly.

If the user wants to view the details about any one company, the user may also simply click on the corresponding hypertext link, if one exists, generating matching information about the found company. Such information can preferably include: Company Name, Address, City, State, Zip Code, Phone Numbers, Contact Person, the slogan of the company, the mission statement of the company, the products and/or services that are provided in detail, e-mail, and Web site address. If the company has Internet coupons, the user can print out those coupons directly.

The Request Express feature enables a user to issue a personalized request, similar to a Request For Proposal, directly to the company. The database query process assists the user in forming their specific request in the form of category-related options or questions based on the user's entries in the initial search process. The query is sent to the business by e-mail or by fax depending on how the company has indicated it desires to receive inquiries. The user can then specify their desired format for receiving bids from those members that reply (e.g., fax, e-mail, phone, etc.) along with their requested deadline and other preferences.

The user that participates in the above service via an operator assisted call center can elect to connect directly with their desired member via a "Direct Connect" feature, enabling immediate call completion between buyer and seller. The user can also request any coupons that are offered by participating members who pay the provider a fee to be included in the couponing feature. If the desired business has elected to participate in the couponing feature, the user will receive their coupon via e-mail, file transfer, fax or postal mail. In some cases, the operator can verbally provide the user with a special code that the business will use to identify the customer and provide the "discount" or special offer.

Figure 7:
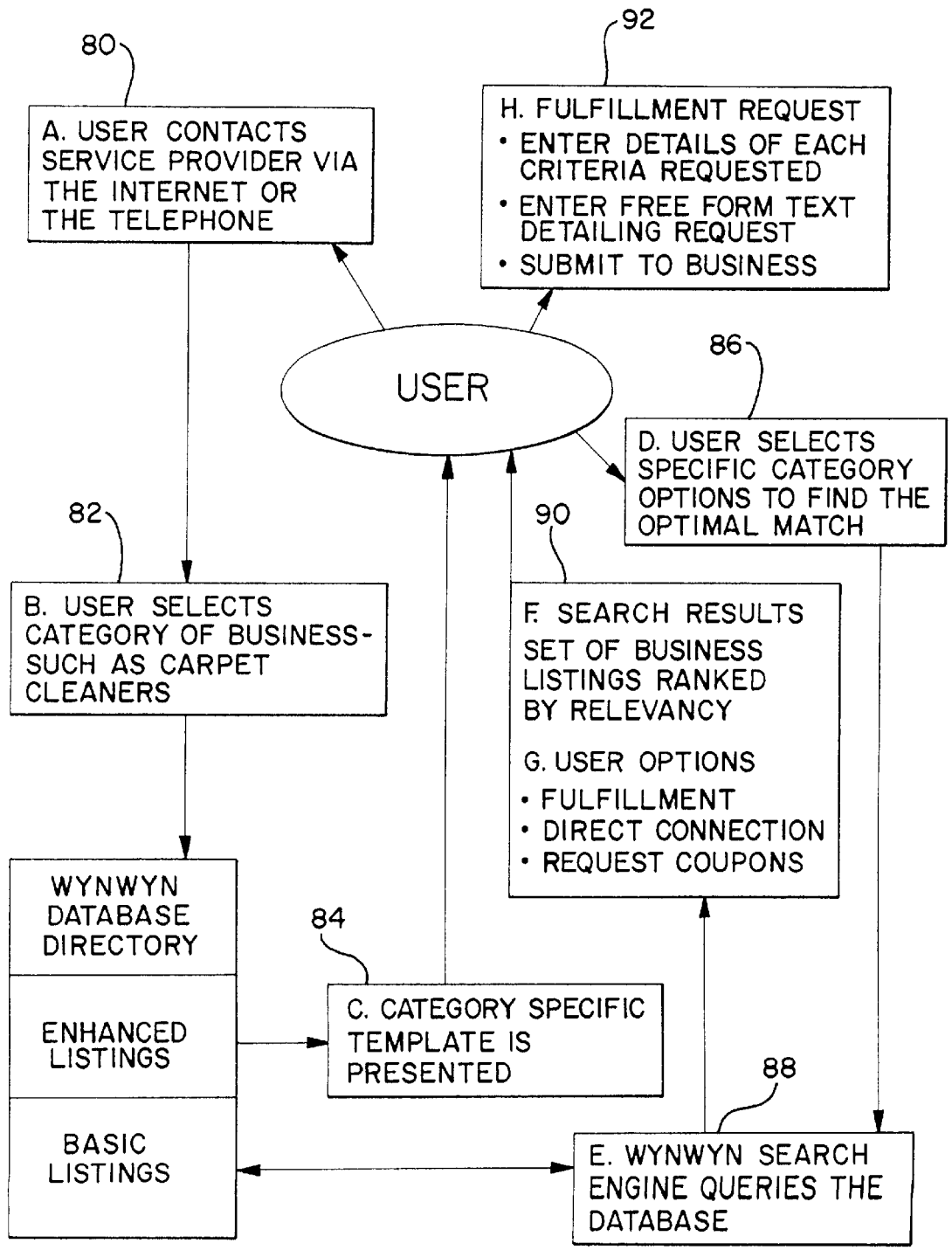
FIG. 7 is a flow chart of the method of the invention from the user's perspective.

The following example search is illustrated in FIG. 7. Assume the user is interested in a carpet cleaner to clean 12 rooms of their house by next Friday. At step 80 the user enters the search provider's Web site, or calls a toll free number to be connected to the call center where a live operator assists the caller through the entire process. The user can select the Main Category of "Home and Garden" to find the related category of "Carpet Cleaners", or simply type in "Carpet Cleaner" in the search screen, along with their Zip Code, at step 82. The database/directory presents at step 84 a Carpet Cleaner template. The user can select the Specific Fields, e.g., "Odor Removal", "Repair" and "Furniture and Upholstery Cleaning" at step 86, as well as the Standard Field for "Internet Coupons". The search engine then generates at step 88 a listing of all the carpet cleaners in the local area (as specified by the Zip code the user enters), ranked by relevancy—those that best match the user's specific requests are listed first. The user can then select at step 90 from this list and make any telephone calls to the cleaners on their own, or they can elect to participate in other provider services.

For the Request Express option, the user then completes the Carpet Cleaner database query that generates relevant information for a participating business to use to prepare their response for a quote—such as number of rooms, size of rooms, types of carpeting and upholstery to be cleaned, etc. The user then specifies the deadline of when the response should be sent as well as their preference for receipt of these response bids. If the user is participating via the call center, they can elect to be connected directly to the carpet cleaner who best matches their specific request. The user can also search for those cleaners that are offering coupons as a sales incentive, to be received via e-mail or fax.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

I claim:

1. A method for searching businesses in an electronic business directory database, said method comprising the steps of:

identifying at least one search criteria, the at least one search criteria defined through research about businesses in at least one category of business;

obtaining business directory data for at least one business listing, the business directory data comprising a business name, address and telephone number;

developing at least one category attribute representative of the at least one business listing to facilitate categorical classification of the at least one business listing, the at least one category attribute comprising hours of operations, specialty services, detailed product and services, and special promotions;

dynamically deriving at least one search template in response to a search request received from a user, the at least one search template comprising at least one field representative of the at least one category attribute;

using the at least one search template to electronically search the electronic business directory database to identify at least one business for the at least one category attribute; and submitting a request for proposal to at least one identified business.

2. The method defined in claim 1, further comprising the step of completing a business transaction in response to the search request.

3. The method defined in claim 1, further comprising the step of completing a business transaction with the at least one business identified in response to the search request.

4. The method defined in claim 1, further comprising the step of dynamically deriving at least one template for submitting the request for proposal, said template comprising at least one field generated based on the at least one category attribute.

5. The method defined in claim 4, further comprising the step of communicating the request for proposal via telephone.

6. The method defined in claim 4, further comprising the step of communicating the request for proposal via e-mail.

7. The method defined in claim 4, further comprising the step of communicating the request for proposal via fax.

8. The method defined in claim 1, further comprising the step of saving business directory data for the at least one business listing saved in the form of a binary string.

9. The method defined in claim 8, wherein the string comprises 32-bits.

10. The method defined in claim 8, wherein the string comprises 16-bits.

11. The method defined in claim 1, further comprising the step of creating a business template in response to the business directory data.

12. The method defined in claim 1, wherein the search template corresponds to the categorical classification of the at least one business listing.

13. The method defined in claim 12, wherein a binary logic value one is used to indicate at least one business category chosen by the user to form the search request.

14. A system for searching businesses in an electronic business directory database, said system comprising:

a data retrieval system operative to allow ready and willing buyers to find and contact qualified businesses based on at least one business category attribute, the at least one business category attribute comprising hours of operations, specialty services, detailed product and services, and special promotions;

a database coupled to the data retrieval system, the database for storing business directory data including enhanced information regarding local businesses;

an electronic distribution network coupled to the database, the electronic distribution network for facilitating connections between motivated buyers and qualified sellers; and means for submitting a request for proposal to at least one qualified business.

15. The system defined in claim 14, wherein the connection between motivated buyers and qualified sellers is electronic.

16. The system defined in claim 15, wherein the connection employs live, enhanced directory assistance operators via telephone.

17. The system defined in claim 15, wherein the connection comprises the World Wide Web.

18. The system defined in claim 14, wherein the data retrieval system comprises means for dynamically deriving at least one search template in response to a search request received from a user.

19. The system defined in claim 18, further comprising means for using the at least one search template to electronically search the database to identify at least one business in response to the search request.

20. The system defined in claim 19 further comprising means for dynamically deriving at least one template for submitting the request for proposal, said template comprising at least one field generated based on the at least one business category attribute.

21. The system defined in claim 18, wherein the search template corresponds to a categorical classification of at least one business listing.

22. The system defined in claim 14, wherein the data retrieval system comprises means for creating a business template in response to the business directory data.

* * * * *